United States Patent
Jarboe et al.

(10) Patent No.: US 6,267,408 B1
(45) Date of Patent: Jul. 31, 2001

(54) AIR-BAG ARRANGEMENT

(75) Inventors: Patrick G. Jarboe, Almont Twp.; James N. Sonnenberg, Royal Oak; Robert F. McGee, Clawson, all of MI (US)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/381,827

(22) PCT Filed: Mar. 18, 1998

(86) PCT No.: PCT/SE98/00488

§ 371 Date: Dec. 20, 1999

§ 102(e) Date: Dec. 20, 1999

(87) PCT Pub. No.: WO98/42543

PCT Pub. Date: Oct. 1, 1998

(30) Foreign Application Priority Data

Mar. 24, 1997 (GB) .................................... 9706067

(51) Int. Cl.[7] .................................................. B60R 21/24
(52) U.S. Cl. ......................................... 280/729; 280/743.1
(58) Field of Search ................................. 280/729, 743.1, 280/739, 740, 731, 743.2

(56) References Cited

U.S. PATENT DOCUMENTS

| 5,240,283 | 8/1993 | Kishi et al. . |
|---|---|---|
| 5,253,892 | 10/1993 | Satoh . |
| 5,358,273 | 10/1994 | Onishi et al. . |
| 5,501,488 | 3/1996 | Saderholm et al. . |
| 5,560,649 | 10/1996 | Saderholm et al. . |
| 5,586,782 | * 12/1996 | Zimmerman, II et al. ....... 280/730.2 |
| 5,669,628 | * 9/1997 | Kaufmann et al. .................. 280/739 |
| 5,839,755 | * 11/1998 | Turnbull .............................. 280/739 |

FOREIGN PATENT DOCUMENTS

| 41 42 326 | 6/1993 | (DE) . |
|---|---|---|
| 0 739 784 | 10/1996 | (EP) . |
| 0 739 790 | 10/1996 | (EP) . |
| 2 268 128 | 1/1994 | (GB) . |

* cited by examiner

*Primary Examiner*—Daniel G. DePumpo
*Assistant Examiner*—David R. Dunn
(74) *Attorney, Agent, or Firm*—Venable; Robert Kinberg

(57) ABSTRACT

An air-bag arrangement for use in a motor vehicle comprises a gas generator(9) which generates gas when an accident occurs. An air-bag is provided to be inflated by the gas. The air-bag comprises three super-imposed fabric layers(2,3,4), the outer peripheries of which are conjoined by a seam(5). A central aperture(6) in the lower-most layer receives the gas outlet(8) of the gas generator. A plurality of apertures(12) are formed in the intermediate layer and seams(13) interconnect the intermediate layer(3) and the lower-most(2) adjacent the apertures. The seams(13) partially surround each aperture, but are not present in a region(14) which is radially outwardly positioned relative to the center of the intermediate layer(3). This arrangement causes the bag, on inflation, to inflate laterally outwardly before inflating towards the occupant of the vehicle to be protected by the bag.

10 Claims, 5 Drawing Sheets

AIR-BAG ARRANGEMENT

THE PRESENT INVENTION relates to an air-bag arrangement, and more particularly relates to an air-bag arrangement for use in a motor vehicle.

It has been proposed previously to provide an air-bag within a motor vehicle, adapted to be inflated in the event that an accident should occur. Typically such an air-bag is formed of fabric and is associated with a gas generator that is adapted, when activated, to generate a substantial quantity of gas within a very short period of time. The air-bag is usually initially in a folded state, and the gas from the gas generator is directed to the interior of the air-bag. The air-bag thus unfolds and is inflated. When the air-bag is inflated, it is positioned in front of or adjacent an occupant of a motor vehicle in order to protect or cushion the occupant of the vehicle.

When an air-bag of this type is inflated, it is not unusual for the part of the air-bag which is located closest to the occupant of the vehicle to be given a very substantial acceleration in a direction towards the occupant of the vehicle. Thus, this part of the air-bag may impact with the occupant of the vehicle, especially if the occupant of the vehicle is sitting forwardly of the anticipated position. It is also not unusual for an air-bag of this type to become trapped if the air-bag is inflated when the occupant to be protected by the air-bag, is sitting forwardly and is thus located very near to the unfolded bag. The presence of the occupant prevents the bag from unfolding in the correct manner and as a consequence of the entrapment of the bag in this way, very high pressures can be generated within the bag. This can result in very high forces being applied to the occupant of the vehicle.

Various attempts have been made to provide air-bags in which this problem is reduced. DE-A-4,412,326 shows an air-bag having three super-imposed layers which define two chambers. Gas from the gas generator is initially supplied to the lower chamber which thus inflates first. Subsequently gas flows from this chamber into the second chamber through apertures formed in the intermediate layer. The movement of the intermediate layer is restricted by straps which are provided with tear seams. The arrangement is therefore relatively complex.

BRIEF SUMMARY OF THE INVENTION

The present invention seeks to provide an improved air-bag arrangement.

According to this invention there is provided an air-bag arrangement for use in a motor vehicle, the air-bag arrangement comprising a gas generator, means to activate the gas generator in response to an accident occurring, and an air-bag to receive gas from the gas generator, the air-bag comprising three super-imposed fabric layers, the outer peripheries of the three super-imposed layers being conjoined, there being a substantially centrally located aperture provided in the lower-most layer to receive the gas outlet of the gas generator, there being a plurality of apertures formed in the intermediate layer, there being means inter-connecting regions of the intermediate layer adjacent each of said apertures to the lower-most layer, said inter-connecting means partially surrounding each said aperture, but not being present in a region adjacent each aperture which is radially outwardly positioned relative to the centre of said intermediate layer.

Preferably the means inter-connecting the intermediate layer and the lower layer comprise a seam.

Conveniently the seam is a one-piece woven seam.

Advantageously means inter-connecting the intermediate layer and the base layer extend in an unbroken form adjacent the radially inner side of each said aperture and around the opposed ends of said aperture and extend partly along the radially outer-most side of each aperture.

Preferably said apertures lie on a notional circle.

Conveniently each said aperture is of oval form.

Alternatively each said aperture is of elongate arcuate form.

Preferably two groups of said apertures are provided, one group of apertures lying on the periphery of a notional circle, centred on the centre of the intermediate layer of relatively small diameter and the other group of apertures comprising a group of apertures located on the periphery of a notional circle centred on the centre of the intermediate layer of a great diameter.

Conveniently each aperture defines a re-entrant radially inner edge and each means inter-connecting the intermediate layer and the lower layer associated with said aperture defines a re-entrant radially inwardly directed edge.

Advantageously, the means inter-connecting the intermediate layer and the lower layer adjacent each aperture define side portions which diverge outwardly from the radially inner side of the aperture to the radially outer side of each aperture.

Advantageously the air-bag is adapted so that, on actuation of the gas generator, initially gas is supplied to a region located substantially centrally of the air-bag between the intermediate layer and the lower-most layer in order to inflate that region, and subsequently is passed to a radially outer substantially annular region located between the intermediate layer and the lower-most layer to inflate that region and, during the final stages of inflation of the bag, gas passes through the apertures in the intermediate layer to inflate the space between the intermediate layer and the upper layer.

BRIEF DESCRIPTION OF THE FIGURES

In order that the invention may be more readily understood, and so that further features thereof may be appreciated, the invention will now be described, by way of example, with reference to the accompanying drawings in which.

DETAILED DESCRIPTION OF THE INVENTION

Figure 1:
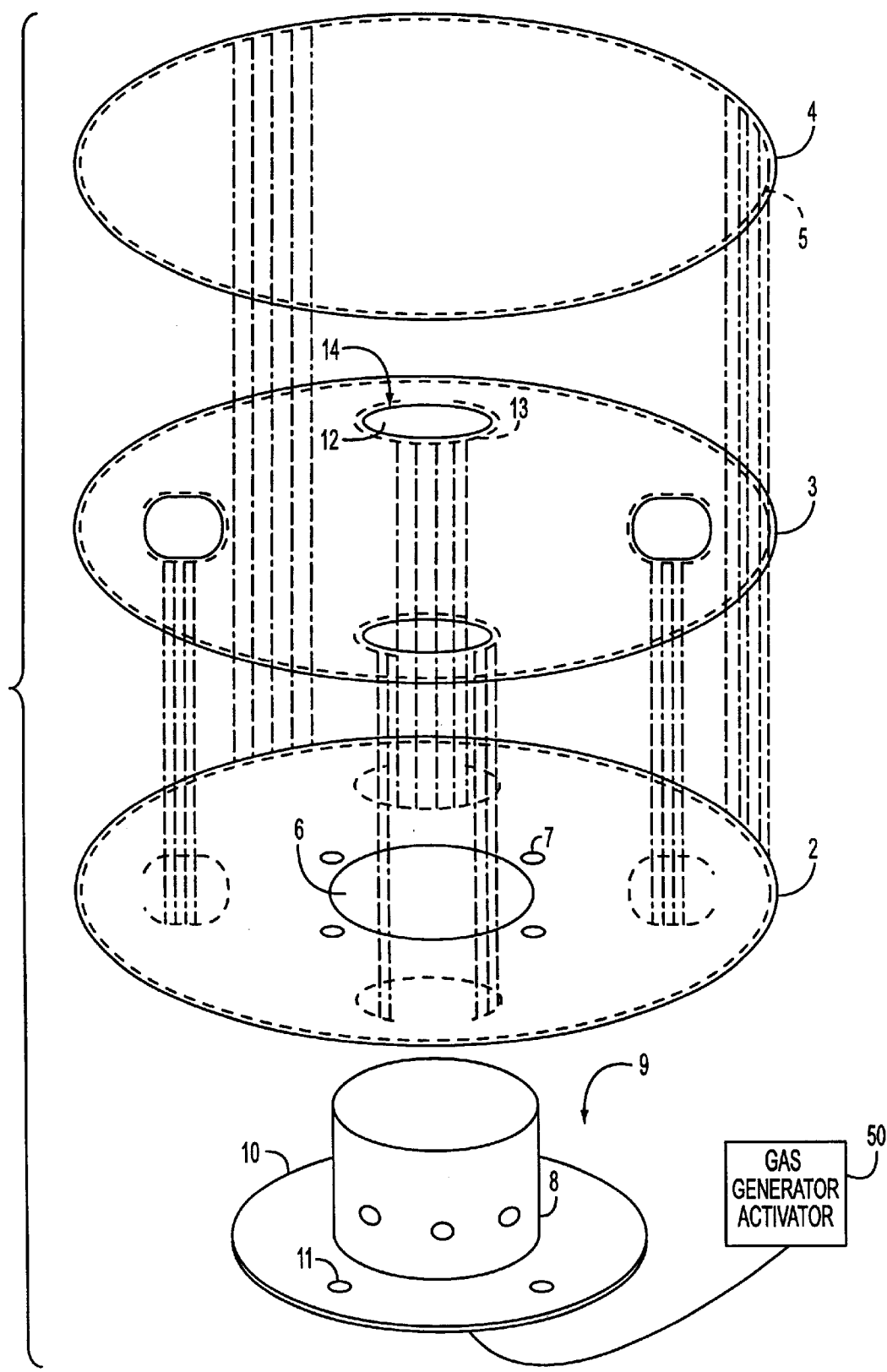
FIG. 1 is a diagrammatic exploded view of an air-bag in accordance with the invention.

Referring initially to FIG. 1 of the accompanying drawings, an air-bag arrangement in accordance with the invention comprises an air-bag 1 which is formed of three super-imposed layers of fabric 2, 3, 4. The super-imposed layers of fabric are each of circular form having the same diameter, and the three layers are super-imposed with the outer peripheries of the three layers of fabric being inter-connected by means of a seam shown schematically as seam 5.

The lower-most layer 2 is provided with a central aperture 6 surrounded by a plurality of relatively small apertures 7. The central aperture 6 is adapted to receive a cylindrical housing 8 forming the gas outlet of the gas generator 9. The gas generator incorporates an outwardly directed flange 10 having a plurality of securing apertures 11 formed therein, the securing apertures 11 being adapted to be co-aligned with the relatively small apertures 7 to receive appropriate securing means such as bolts.

A gas generator activator 50 activates the gas generator 9 when an accident occurs.

The intermediate layer of fabric 3 is provided with a plurality of relatively evenly spaced apertures 12 therein, the apertures 12 being located substantially mid-way between the centre of the intermediate layer 3 and the outer periphery thereof. A seam, such as the seam 13, is provided in the region of each aperture 12, inter-connecting the intermediate layer 3 to the lower-most layer 2. Each seam 13 substantially surrounds the aperture which it lies adjacent, but the seam does not totally surround the aperture and therefore defines a gap 14 between the opposed seam ends, the gap being located adjacent the respective aperture 12 at a point which is located adjacent the outer periphery of the intermediate layer 3. Thus the gap is effectively directed radially outwardly. Each seam extends in an unbroken form adjacent the radially inner side of each aperture and around the opposed ends of each aperture and extend partly along the radially outer-most side of each aperture.

The entire air-bag, when fabricated, will be folded and stored within a housing which is provided with initially closed doors, as is conventional.

On activation of the gas generator, gas is initially ejected from the cylindrical housing 8 into the space between the lower-most layer 2 and the intermediate layer 3 in the region 15 which is bounded by the apertures 12 and the associated seams 13. The region 15 thus commences to inflate and forms a relatively small "dome". This will serve to open the doors of the housing in which the folded air-bag is located.

Subsequently gas will flow radially outwardly, following radially outwardly flow paths 16 which pass through the spaces or gaps 17 located between the adjacent apertures 12 and the associated seams 13.

The radially outwardly directed flows then enter an annular region 18 which is located radially outwardly of the apertures 12 and the associated seams 13, and radially inwardly of the outer seam 5. On entering the annular space 18, the radially outwardly directed gas flows bifurcate to form circumferentially directed flows 19,20. These flows inflate the annular outer region 18 of the space between the lower layer 2 and the intermediate layer 3, providing that region with inherent rigidity.

The above-described flow of gas partially inflates the air-bag but causes the entire bag structure to deploy radially outwardly. The upper layer 4 of the air-bag is not given any substantial acceleration towards the occupant of the vehicle.

It is to be appreciated that, as a consequence of the initial stages during the inflation of the air-bag, as described above, the bag will not become "trapped" as a consequence of the occupant of the vehicle being located in a forward position.

The bag structure is now in the form of a substantially flat disc with a slightly domed central region 15 and a inflated annular outer region 18.

The circumferentially directed gas streams 19,20 subsequently flow inwardly through the gaps 14 defined by the seams 13 and through the apertures 12 into the space between the intermediate layer 3 and the upper layer 4. This space then inflates to provide the inflated air-bag with its conventional substantially spherical shape.

It is to be understood that on activation of the air-bag as described above, initially a relatively small dome-shaped area 15 is inflated to open the doors of the housing, and subsequently the outer annular region 18 is inflated to deploy the air-bag laterally or sideways, and only in the final stages of inflation is the space immediately adjacent the upper layer 4 of the air-bag inflated to cause that upper layer to move towards the occupant of the vehicle. Since the gas is supplied to the region between the intermediate layer and the upper layer after the upper layer has assumed a substantially planar condition, no one part of the upper layer is provided with an excessive velocity directed towards the occupant of the vehicle. The entire area of the upper layer thus gradually assures a spherical shape as inflation of the bag is completed. The term "gradually" is used in a relative sense since the entire inflation procedure is complete within a few milliseconds.

Whilst the invention has been described with reference to one embodiment, in the form of a spherical bag as may be intended to be mounted within a steering wheel, it is to be appreciated that modified embodiments may readily be devised, such as a bag to be mounted in a dashboard to protect a passenger in a vehicle.

Figure 2:
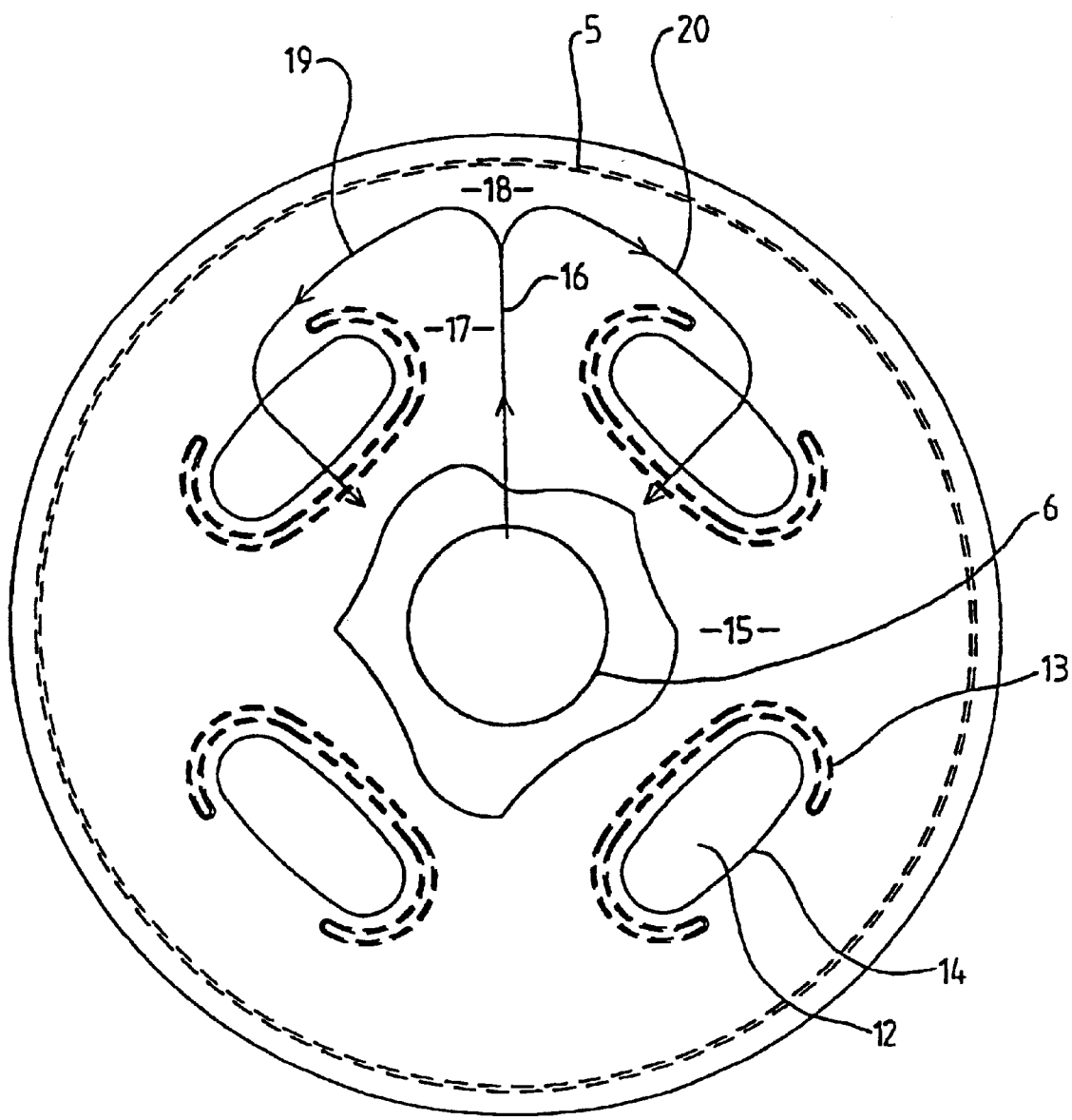
FIG. 2 is a plan view of the air-bag of FIG. 1, with the upper layer removed and with part of the intermediate layer cut away for the sake of clarity of illustration.
Figure 3:
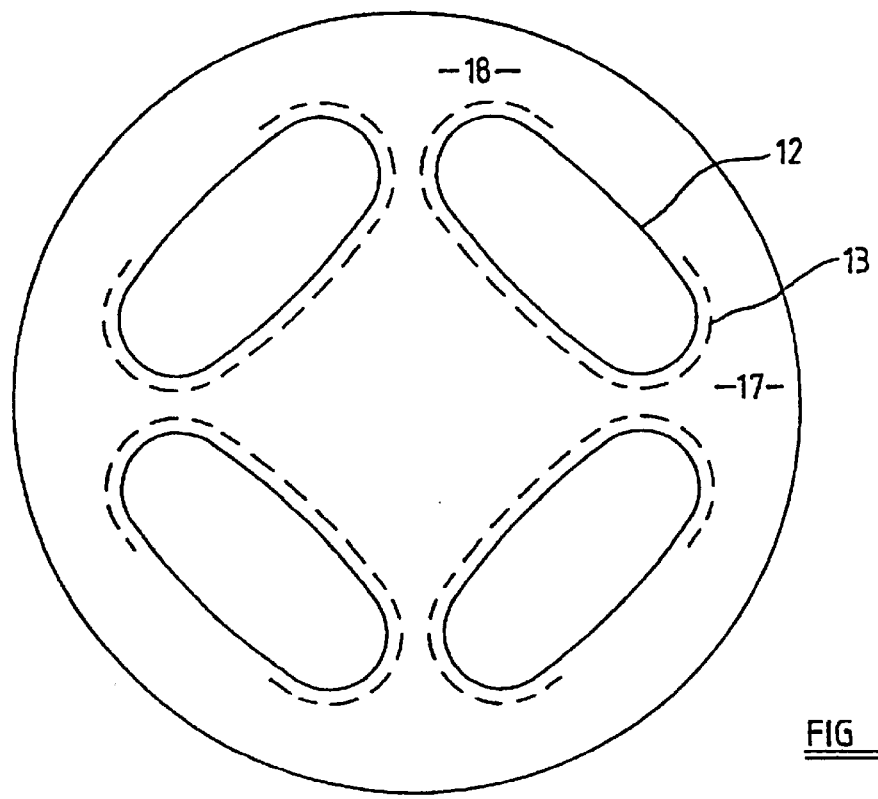
FIG. 3 is a view illustrating an alternate form of intermediate layer for use in embodiments of the invention.

FIG. 3 is a plan view of an alternate form of intermediate layer 3. In this particular embodiment of the invention, the intermediate layer is provided with apertures 12 which are associated with seams 13 and which are rather larger than the apertures provided in the embodiment of FIGS. 1 and 2, with the consequence that the spaces 17 between the adjacent apertures and seams are somewhat smaller than in the embodiment of FIGS. 1 and 2.

Figure 4:
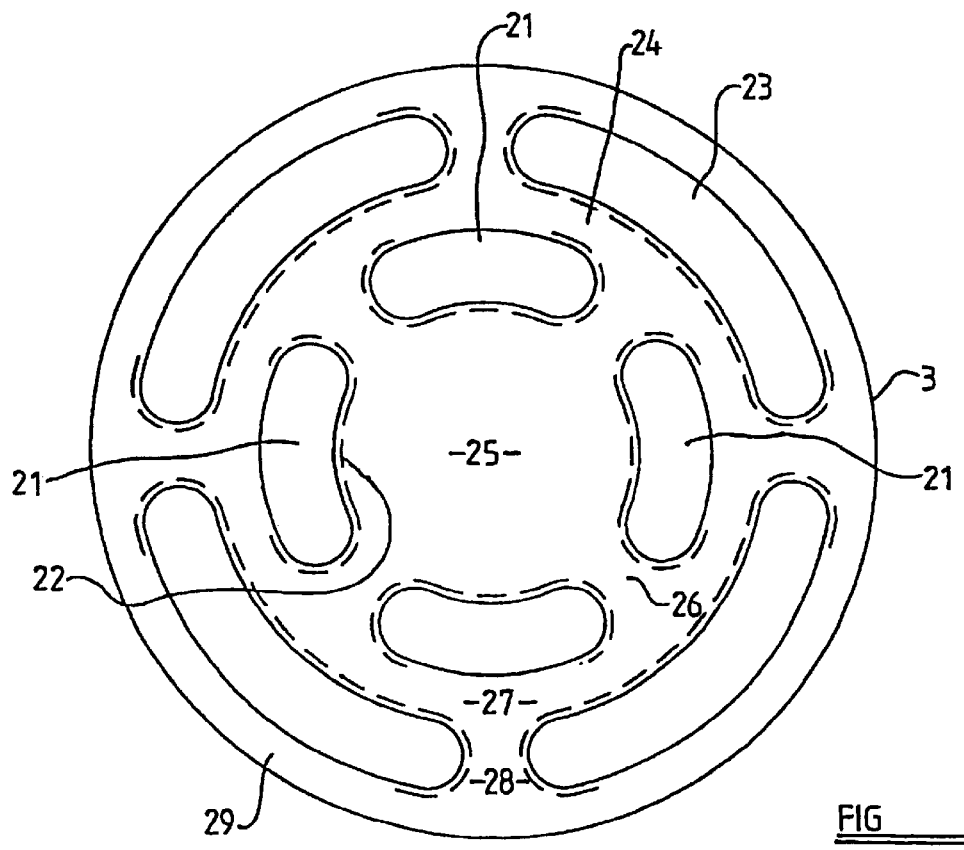
FIG. 4 is a view corresponding to FIG. 3 illustrating a further alternative form of intermediate layer for use in another embodiment of the invention.

FIG. 4 illustrates the intermediate layer of yet another embodiment of the invention in which a plurality of apertures are formed in the intermediate layer. The apertures in the intermediate layer form two groups of apertures. The first group of four apertures 21 comprises four apertures, each of an elongate arcuate or "kidney" shape, the apertures being substantially aligned with a notional circle centred on the centre of the intermediate layer 3. The apertures 21 are located at a distance part way between the centre and the outer periphery of the intermediate layer 3. Each aperture is associated with a seam 22, again of elongate substantially arcuate form, the seam substantially surrounding the radially inner part of each aperture 21 and the ends of each aperture 21. Each seam defines a gap located radially outwardly of the associated apertures.

A second group of four apertures 23 is provided at a position located immediately outwardly from the apertures 21. Each aperture 23 is of elongate arcuate or "kidney" shape, the apertures 23 lying on the periphery of a notional circle centred on the centre of the sheet 3. The apertures 23 are located adjacent the outer periphery of the sheet 3. Each aperture 23 is associated with a seam 24, of elongate arcuate form, the seam 24 lying adjacent the radially inner portion of each aperture 23. Each seam 24 defines a gap located radially outwardly of the associated aperture.

The combination of the two series of apertures and the two series of seams provides a bag which inflates initially in a radially outwardly direction relatively rapidly, with gas flowing initially from the gas generator into a centrally located space 25, which is bounded by the first group of apertures 21, the gas then flowing through spaces 26 between the seams 22, to fill an annular space 27 located between the two series of apertures 21 and 23. The gas then flows through spaces 28 between the adjacent seams 24 to fill an annular outer peripheral space 29.

This inflation of the bag causes initially a dome-shaped configuration to arise in the central region 25, which will serve to open the doors of a housing in which the air-bag is located, and subsequently radially a outwardly directed deployment of the bag as the spaces 27 and 29 become inflated. The bag will thus occupy a substantially planar condition. Gas will flow in increasing quantities through the apertures 21 and 23 to the space between the intermediate layer 3 and the upper layer 4, thus completing the inflation of the bag.

Figure 5:
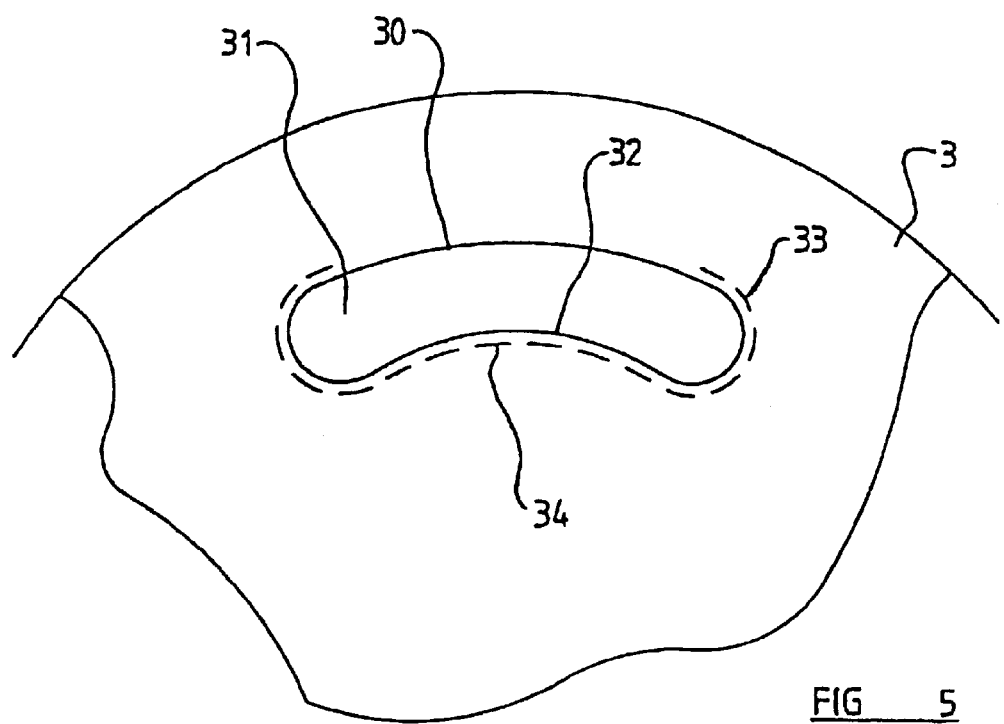
FIG. 5 illustrates part of a further intermediate layer comprising part of another embodiment of the invention.

FIG. 5 illustrates part of an intermediate sheet 3 illustrating a particular form of aperture 30. The aperture is of arcuate form having slightly enlarged ends 31. The aperture presents a recessed edge 32 which is directed radially inwardly. The aperture is associated with a seam 33 which also presents a co-aligned recessed radially inwardly directed portion 34. This form of seam presents no abrupt edges where tearing might commence during rapid gas flow.

Figure 6:
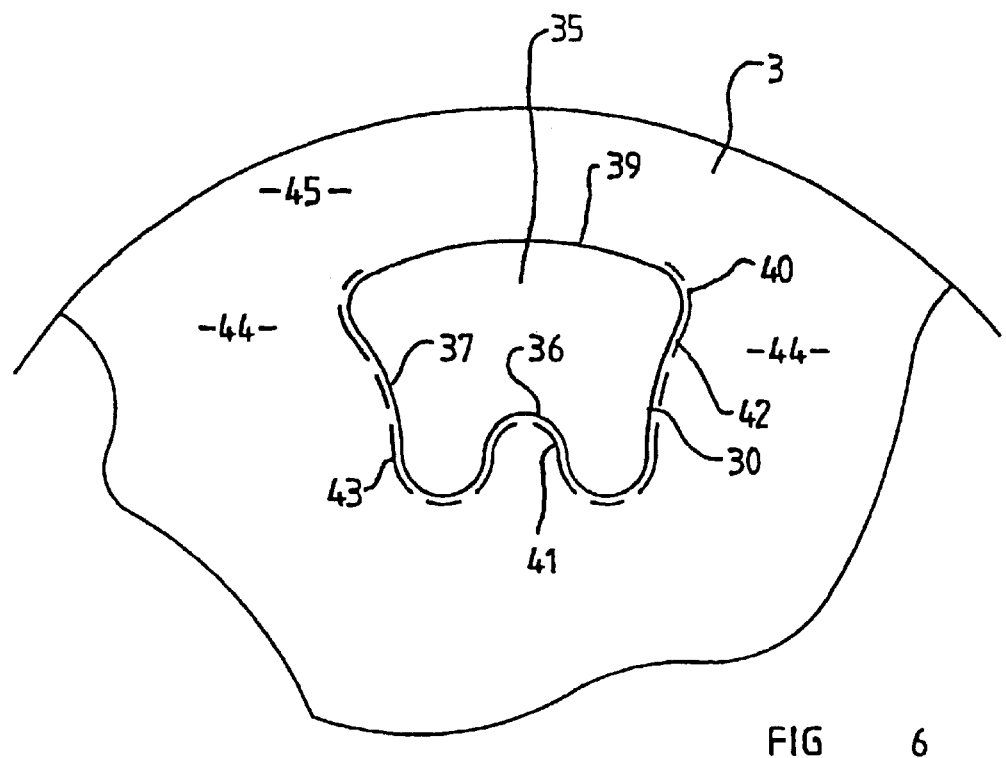
FIG. 6 illustrates part of yet a further intermediate layer that forms part of yet another embodiment of the invention.

FIG. 6 illustrates another embodiment of the invention in which each aperture 35 has a radially inwardly directed edge 36 which is of re-entrant form. The aperture has two diverging sides 37,38 connecting the radially inner side 36 to the radially outer side 39.

A seam 40 associated with the aperture 35 also has a re-entrant radially inner portion 41 and two diverging side portions 42,43. The diverging side portions of the seams provided for adjacent apertures define converging flow paths 44 which are relatively constricted. The flow paths lead to an outer annular region 45.

The configuration of the seams shown in FIG. 6 minimises any risk of the seam being damaged during inflation of the bag, and the configuration of the flow paths 44 helps to ensure an ideal inflation characteristic.

Figure 7:
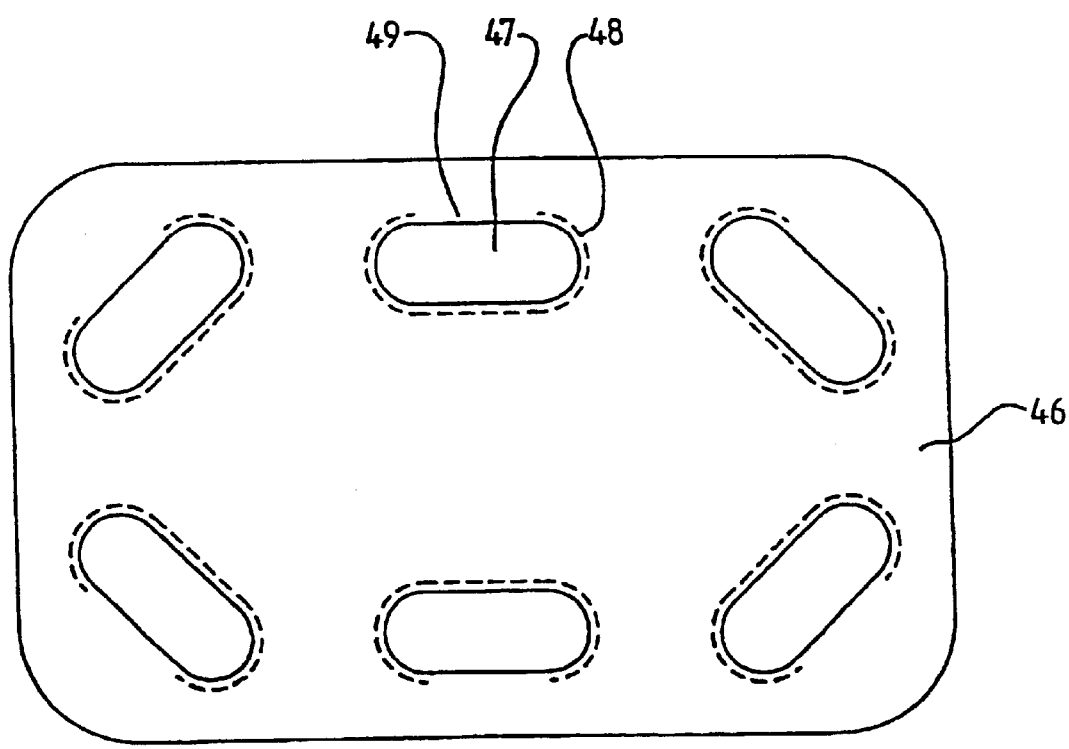
FIG. 7 illustrates part of yet a further intermediate layer that forms part of yet another embodiment of the invention.

FIG. 7 illustrates an intermediate layer for a passenger bag which is adapted to be initially stored within the dashboard of a motor vehicle. Conventionally, such a passenger bag is of a rectangular form rather than a circular form. Thus, as can be seen in FIG. 7, the intermediate layer 46 of the bag is of generally rectangular form and is provided with a plurality of apertures 47 which are located at positions spaced slightly inwardly from the outer periphery of the bag. The apertures 47 effectively lie on a notional oval. Each aperture 47 is provided with a seam 48 located adjacent the aperture and partially surrounding the aperture. Each seam 48 does not completely surround the aperture, and therefore defines a gap 49 between the opposed seam ends. The gap is located adjacent the respective aperture at a point which is located adjacent the outer periphery of the intermediate layer 46. Thus the gap is effectively directed radially outwardly. Each seam extends in an unbroken form adjacent the radially inner side of each aperture and around the opposed ends of each aperture, and extends partly along the radially outer-most side of each aperture.

Whilst, in the foregoing description, reference has been made to seams, it is to be appreciated that the seams may be effected by stitching, although any appropriate technique for bonding or securing together the adjacent layers of the bag may be utilised. It is to be clearly understood that it has been proposed previously to weave together the threads forming adjacent layers of fabric, so that in the regions where the threads are woven together, a seam is created. This technique is known as "one-piece weaving". This technique may be used to fabric air-bags as described above.

The shape and dimension of the apertures, in combination with the positioning of the seams, will define the position and dimension of the flow paths to be followed by gas when the air-bag is inflated. Consequently, these features of the bag will determine the deployment pattern of the bag as it is inflated.

What is claimed is:

1. An air-bag arrangement for use in a motor vehicle, the air-bag arrangement comprising:

a gas generator, means to activate the gas generator in response to an accident occurring, and an air-bag to receive gas from the gas generator, the air-bag comprising three super-imposed fabric layers with outer peripheries conjoined, the three fabric layers including a lower layer, an intermediate layer, and an upper layer, a substantially centrally located aperture provided in the lower layer to receive a gas outlet of the gas generator, a plurality of apertures formed in the intermediate layer, and means interconnecting regions of the intermediate layer adjacent each of said plurality of apertures to the lower layer, wherein said interconnecting means partially surrounds each of said plurality of apertures, said interconnecting means being omitted in a region adjacent each of said plurality of apertures which is radially outwardly positioned relative to the center of the intermediate layer, the arrangement being adapted so that on actuation of the gas generator, initially gas is supplied to a region located substantially centrally of the air-bag between the intermediate layer and the lower layer in order to inflate that region, and subsequently is passed to a radially outer substantially annular region located between the intermediate layer and the lower layer to inflate that region and, during final stages of inflation of the bag, gas passes through the each of said plurality of apertures in the intermediate layer to inflate space between the intermediate layer and the upper layer.

2. An air-bag according to claim 1 wherein the means interconnecting the intermediate layer and the lower layer comprise a seam.

3. An air-bag according to claim 2 wherein the seam is a one-piece woven seam.

4. An air-bag arrangement according to claim 1 wherein the means interconnecting the intermediate layer and the lower layer extends in an unbroken form adjacent a radially inner side of each of said plurality of apertures and around opposed ends of each of said plurality of apertures and extend partly along a radially outer-most side of each of said plurality of apertures.

5. An air-bag arrangement according to claim 1 wherein said plurality of apertures lie on a notional circle.

6. An air-bag arrangement according to claim 1 wherein each of said plurality of apertures is of oval form.

7. An air-bag arrangement according to claim 1 wherein each of said plurality of apertures is of elongate arcuate form.

8. An air-bag arrangement according to claim 1 wherein two groups of said plurality of apertures are provided, a first group of apertures lying on a periphery of a notional circle of a relatively small diameter and centered on a center of the intermediate layer, and a second group of apertures lying on a periphery of another notional circle of a greater diameter than the diameter of the first group of apertures and centered on the center of the intermediate layer.

9. An air-bag arrangement according to claim 1 wherein each of said plurality of apertures defines a re-entrant radially inner edge and each said means interconnecting the intermediate layer and the lower layer corresponding to each of said plurality of apertures defines a re-entrant radially inwardly directed portion.

10. An air-bag according to claim 1 wherein the means interconnecting the intermediate layer and the lower layer adjacent each of said plurality of apertures define side portions which diverge outwardly from a radially inner edge of each of said plurality of apertures to a radially outer side of each of said plurality of apertures.

* * * * *